(12) United States Patent
Tylosky (10) Patent No.: US 6,953,313 B2
(45) Date of Patent: Oct. 11, 2005

(54) SELF-LOCKING LINEAR ADJUSTMENT MECHANISM

(76) Inventor: Gordon Tylosky, 6491 53$^{rd}$ Ave. West, Mukilteo, WA (US) 98275

( * ) Notice: Subject to any disclaimer, the term of this patent is extended or adjusted under 35 U.S.C. 154(b) by 96 days.

(21) Appl. No.: 10/603,780

(22) Filed: Jun. 26, 2003

(65) Prior Publication Data

US 2004/0261554 A1 Dec. 30, 2004

(51) Int. Cl.$^7$ .............................................. F16B 35/00
(52) U.S. Cl. .................... 411/389; 411/322; 403/322.2; 403/322.3
(58) Field of Search ............................ 74/89.23, 89.35, 74/89.39; 403/322.2, 322.3, 325, 109.3, 109.5, 374.1, 374.2; 411/348, 389, 321, 322

(56) References Cited

U.S. PATENT DOCUMENTS

| | | | |
|---|---|---|---|
| 2,814,324 A | 11/1957 | Shur | 411/267 |
| 3,309,951 A | * 3/1967 | Sylvester | 82/157 |
| 3,643,523 A | 2/1972 | Mihaila | 74/502 |
| 3,667,313 A | 6/1972 | Young, Jr. | 74/502.4 |
| 3,946,984 A | 3/1976 | Sutter | 251/129.03 |
| 3,992,120 A | 11/1976 | Recker | 403/317 |
| 4,238,974 A | 12/1980 | Fawcett | 74/502.4 |
| 4,378,187 A | 3/1983 | Fullerton | 411/267 |
| 4,531,872 A | 7/1985 | Warkotsh | 411/433 |
| 4,569,242 A | 2/1986 | Hu | 74/424.95 |
| 4,603,998 A | 8/1986 | Bober et al. | 403/322.2 |
| 4,618,300 A | 10/1986 | Goebel | 411/433 |
| 4,646,546 A | 3/1987 | Smith | 68/212 |
| 4,684,284 A | 8/1987 | Bradley, Jr. | 403/320 |
| 4,696,203 A | 9/1987 | Gregory | 74/500.5 |
| 4,756,654 A | 7/1988 | Clough | 411/437 |
| 4,764,071 A | 8/1988 | Lawrence et al. | 411/433 |
| 4,773,150 A | 9/1988 | Gregory | 29/453 |
| 4,790,580 A | 12/1988 | Casilio | 292/262 |
| 4,792,255 A | 12/1988 | McArthur et al. | 403/325 |
| 4,813,810 A | 3/1989 | Suzuki | 403/322.2 |
| 4,919,119 A | 4/1990 | Jonsson et al. | 606/54 |
| 4,974,888 A | 12/1990 | Childers | 292/251 |
| 5,081,811 A | 1/1992 | Sasaki | 52/223.13 |
| 5,105,554 A | 4/1992 | Schnyder et al. | 33/783 |
| 5,233,892 A | 8/1993 | Roberts | 81/177.85 |
| 5,258,772 A | 11/1993 | Inanaga et al. | 343/895 |
| 5,306,979 A | 4/1994 | Schwarz, Jr. | 310/328 |
| 5,335,949 A | 8/1994 | Maury et al. | 292/338 |
| 5,431,540 A | 7/1995 | Doolin et al. | 416/168 R |
| 5,538,245 A | 7/1996 | Moore | 473/239 |
| 5,573,290 A | 11/1996 | Smith | 292/338 |
| 5,588,464 A | * 12/1996 | Tylosky | 137/613 |
| 5,670,968 A | 9/1997 | Inanaga et al. | 343/901 |
| 5,778,733 A | * 7/1998 | Stringer | 74/527 |

(Continued)

FOREIGN PATENT DOCUMENTS

| | | |
|---|---|---|
| DE | 3739710 C1 | 1/1989 |
| DE | 3839663 A1 | 6/1989 |
| DE | 4000424 C2 | 7/1991 |
| DE | 4000424 A1 | 7/1991 |
| DE | 19701365 A1 | 7/1998 |
| EP | 838600 A1 | 8/1998 |
| FR | 2812923 | 2/2002 |
| GB | 2279693 A | 1/1995 |

Primary Examiner—David M. Fenstermacher
(74) Attorney, Agent, or Firm—Richard C. Litman (57) ABSTRACT

A self-locking linear adjustment mechanism may be configured in the form of a rod assembly or a cartridge assembly. The self-locking linear adjustment mechanism in the form of a cartridge assembly includes a self-locking linear adjustment mechanism including a locking tumbler, an adjustment vernier, two end adapters, two roll pins, two precision balls, two locking skirts, two springs, two locking splines, two index pins, and two guide shafts, wherein the self-locking linear adjustment mechanism has a dual function self-locking feature.

20 Claims, 7 Drawing Sheets

U.S. PATENT DOCUMENTS

| | | | |
|---|---|---|---|
| 5,800,108 A | 9/1998 | Cabahug | 411/433 |
| 5,845,898 A | 12/1998 | Halder et al. | 269/48.1 |
| 5,846,042 A | 12/1998 | Iannuzzi | 411/120 |
| 6,158,930 A | 12/2000 | Etter | 409/180 |
| 6,331,091 B2 | 12/2001 | Cross | 403/322.2 |
| 6,361,260 B1 | 3/2002 | Schirrmacher | 411/433 |
| 6,367,341 B1 | 4/2002 | Sleeper et al. | 73/866.5 |
| 6,485,214 B2 | 11/2002 | Schill | 403/13 |
| 6,499,908 B2 | 12/2002 | Hauptmann et al. | 403/322.2 |
| 6,511,100 B1 | 1/2003 | Le Clinche | 285/316 |
| 6,523,441 B2 | 2/2003 | Lee | 81/177.85 |
| 6,540,426 B2 | 4/2003 | Cloyd et al. | 403/122 |
| 2001/0009632 A1 | 7/2001 | Cross | 403/322.2 |
| 2002/0006310 A1 | 1/2002 | Hauptmann et al. | 403/322.2 |
| 2002/0071719 A1 | 6/2002 | Moore | 403/322.2 |
| 2002/0197105 A1 | 12/2002 | Chiang | 403/322.2 |

* cited by examiner

SELF-LOCKING LINEAR ADJUSTMENT MECHANISM

BACKGROUND OF THE INVENTION

1. Field of the Invention

The present invention relates generally to positioning devices and, more particularly, to a self-locking linear adjustment mechanism.

2. Description of the Related Art

Positioning devices for precisely adjusting longitudinal distances between two articles are known in the art. The operation of many of these devices involve a number of time consuming steps, result in mechanical wear, and result in costly construction. A need exists for a positioning device which precisely adjusts the longitudinal distance between two articles with a simple, reliable, and easily accessible locking provision.

The related art is represented by the following references of interest.

U.S. Patent Application Publication No. 2001/0009632 A1, published on Jul. 26, 2001, and U.S. Pat. No. 6,331,091 B2, issued on Dec. 18, 2001 for Gary A. Cross, describe an axle made-up of a left and right axle halves which axially engage to form a completed axle assembly for supporting a roller skate wheel or other rotating member. The Cross application and patent do not suggest a self-locking linear adjustment mechanism according to the claimed invention.

U.S. Patent Application Publication No. 2002/0006310 A1, published on Jan. 17, 2002, and U.S. Pat. No. 6,499,908 B2, issued on Dec. 31, 2002, for Udo Hauptmann et al., describe a locking system for a cylindrical shaft, which, dynamically, can be stressed strongly in the axial direction and can be easily mounted and dismounted. The Hauptmann et al. application and patent do not suggest a self-locking linear adjustment mechanism according to the claimed invention.

U.S. Patent Application Publication No. 2002/0071719 A1, published on Jun. 13, 2002 for Daniel L. Moore, describes a control rod for an aircraft actuator system. The Moore application does not suggest a self-locking linear adjustment mechanism according to the claimed invention.

U.S. Patent Application Publication No. 2002/0197105 A1, published on Dec. 26, 2002 for Jung-Chang Chiang, describes a connection apparatus for an artificial model which can be configured to connect with any spot of the thigh and obtain a curve dividing line such that the dividing line may not expose unpleasantly at the time of exhibiting swimming suit or underwear. The Chiang application does not suggest a self-locking linear adjustment mechanism according to the claimed invention.

U.S. Pat. No. 2,814,324, issued on Nov. 26, 1957 to Ira Shur, describes a nut assembly in a quick acting nut and bolt fastener that enables full fastening and unfastening effect to be attained with only limited turning of the bolt in a proper direction and in which the bolt may be fully fastened and unfastened from the bolt side of the fastener. The Shur patent does not suggest a self-locking linear adjustment mechanism according to the claimed invention.

U.S. Pat. No. 3,643,523, issued on Feb. 22, 1972 to John Mihaila, describes a knob assembly particularly adaptable to a control device form moving the core of a push-pull cable with respect to the casing thereof in gross amounts, and, selectively, in accurately fine, or vernier, increments. The Mihaila patent does not suggest a self-locking linear adjustment mechanism according to the claimed invention.

U.S. Pat. No. 3,667,313, issued on Jun. 6, 1972 to Don L. Young, Jr., describes a flexible remote control with spaced ball bearings for transmitting push and pull forces. The Young, Jr. patent does not suggest a self-locking linear adjustment mechanism according to the claimed invention.

U.S. Pat. No. 3,946,984, issued on Mar. 30, 1976 to Jean G. Sutter, describes a motor-driven control device for a valve rod. The Sutter patent does not suggest a self-locking linear adjustment mechanism according to the claimed invention.

U.S. Pat. No. 3,992,120, issued on Nov. 16, 1976 to Florian B. Recker, describes a shaft coupling apparatus for connecting one shaft to another shaft. The Recker patent and application does not suggest a self-locking linear adjustment mechanism according to the claimed invention.

U.S. Pat. No. 4,238,974, issued on Dec. 16, 1980 to Harry E. Fawcett, describes a flexure-limiting tubular ball and socket universal joint device that protectively supports and guides the inner or center cable of a coaxial push-pull cable assembly while providing a seal effective to exclude dirt and moisture in the variously deflected positions of the inner member and its load-connected extension rod fitting. The Fawcett patent does not suggest a self-locking linear adjustment mechanism according to the claimed invention.

U.S. Pat. No. 4,378,187, issued on Mar. 29, 1983 to Robert L. Fullerton, describes a quick acting nut assembly for selectively engaging a threaded member. The Fullerton patent does not suggest a self-locking linear adjustment mechanism according to the claimed invention.

U.S. Pat. No. 4,531,872, issued on Jul. 30, 1985 to Horst Warkotsh, describes a quick action tensioning nut for fastening a wheel to the mounting shaft of a wheel balancing machine. The Warkotsh patent does not suggest a self-locking linear adjustment mechanism according to the claimed invention.

U.S. Pat. No. 4,569,242, issued on Feb. 11, 1986 to Anny Hu, describes a rapid advancing and clamping mechanism for a clamping device. The Hu patent does not suggest a self-locking linear adjustment mechanism according to the claimed invention.

U.S. Pat. No. 4,603,998, issued on Aug. 5, 1986 to Helmu Bober et al., describes a shaft connecting mechanism for securing a slip-on hub to the power takeoff shaft of a tractor. The Bober et al. patent does not suggest a self-locking linear adjustment mechanism according to the claimed invention.

U.S. Pat. No. 4,618,300, issued on Oct. 21, 1986 to Eickhart Goebel, describes a quick-clamping nut for permitting rapid engagement with an externally threaded member with a minimum of turning to lock a first member to a second member. The Goebel patent does not suggest a self-locking linear adjustment mechanism according to the claimed invention.

U.S. Pat. No. 4,646,546, issued on Mar. 3, 1987 to Ashley P. Smith, describes a locking device for releasably retaining a plurality of yarn packages beneath a pressure plate on a vertically disposed spindle. The Smith patent does not suggest a self-locking linear adjustment mechanism according to the claimed invention.

U.S. Pat. No. 4,684,284, issued on Aug. 4, 1987 to Charles D. Bradley, Jr., describes an anti-rotation lock assembly. The Bradley, Jr. patent does not suggest a self-locking linear adjustment mechanism according to the claimed invention.

U.S. Pat. Nos. 4,696,203 and 4,773,150, issued on Sep. 29, 1987 and Sep. 27, 1998, respectively, to Ted W. Gregory, describe a push-pull vernier control assembly and a method of manufacture thereof for regulating the operating speed of power equipment. The Gregory patents do not suggest a self-locking linear adjustment mechanism according to the claimed invention.

U.S. Pat. No. 4,756,654, issued on Jul. 12, 1988 to Melvyn J. L. Clough, describes a quick action tensioning nut for fastening a wheel to the mounting shaft of a wheel balancing machine. The Warkotsh patent does not suggest a self-locking linear adjustment mechanism according to the claimed invention.

U.S. Pat. No. 4,764,071, issued on Aug. 16, 1988 to Ventura A. Lawrence et al., describes a quick action end-to-end fastener for coupling a pair of reinforcing rods end-to-end. The Lawrence et al. patent does not suggest a self-locking linear adjustment mechanism according to the claimed invention.

U.S. Pat. No. 4,790,580, issued on Dec. 13, 1988 to Leonello Casilio, describes a latching mechanism for providing a locking support for an article which periodically requires to be moved from a rest position to a stable elevated position. The Casilio patent does not suggest a self-locking linear adjustment mechanism according to the claimed invention.

U.S. Pat. No. 4,792,255, issued on Dec. 20, 1988 to James McArthur et al., describes an adjustable coupling assembly which allows an exercising member to be locked and secured in a multitude of positions about a shaft while still permitting the removal of the exercising member. The McArthur et al. patent does not suggest a self-locking linear adjustment mechanism according to the claimed invention.

U.S. Pat. No. 4,813,810, issued on Mar. 21, 1989 to Tsunehiko Suzuki, describes a coupling device in which a shaft or pipe is coupled to a boss member in which balls, disposed in radial holes in the boss, engage a groove on the shaft or pipe. The Suzuki patent does not suggest a self-locking linear adjustment mechanism according to the claimed invention.

U.S. Pat. No. 4,919,119, issued on Apr. 24, 1990 to Ulf Jonsson et al., describes an external fixation device for the fixation of a broken joint. The Jonsson et al. patent does not suggest a self-locking linear adjustment mechanism according to the claimed invention.

U.S. Pat. No. 4,974,888, issued on Dec. 4, 1990 to Spencer L. Childers, describes a fastening apparatus operable to secure a pair of work objects to each other. The Childers patent does not suggest a self-locking linear adjustment mechanism according to the claimed invention.

U.S. Pat. No. 5,081,811, issued on Jan. 21, 1992 to Kensuke Sasaki, describes a self-locking nut mechanism operable to be mounted on a bolt element to secure structural members together. The Sasaki patent does not suggest a self-locking linear adjustment mechanism according to the claimed invention.

U.S. Pat. No. 5,105,554, issued on Apr. 21, 1992 to Urs Schnyder et al., describes an instrument for measuring the dimensions of a rigid object. The Schnyder et al. patent does not suggest a self-locking linear adjustment mechanism according to the claimed invention.

U.S. Pat. No. 5,233,892, issued on Aug. 10, 1993 to Peter M. Roberts, describes a quick release mechanism for tools such as socket wrenches. The Roberts patent does not suggest a self-locking linear adjustment mechanism according to the claimed invention.

U.S. Pat. Nos. 5,258,772 and 5,670,968, issued on Nov. 2, 1993 and Sep. 23, 1997, respectively, to Masayuki Inanaga et al., describe an antenna device equipped with a retractable antenna as a main antenna that is capable of maintaining a receiver function even when the flexible antenna is retracted. The Inanaga et al. patents do not suggest a self-locking linear adjustment mechanism according to the claimed invention.

U.S. Pat. No. 5,306,979, issued on Apr. 26, 1994 to John F. Schwarz, Jr., describes a multiplexing incremental linear actuator system for linearly outputting an output member in the form of a mechanical control wire. The Schwarz. Jr. patent does not suggest a self-locking linear adjustment mechanism according to the claimed invention.

U.S. Pat. No. 5,335,949, issued on Aug. 9, 1994 to Horst Maury et al., describes a telescopic positioning device. The Maury et al. patent does not suggest a self-locking linear adjustment mechanism according to the claimed invention.

U.S. Pat. No. 5,431,540, issued on Jul. 11, 1995 to Leonard J. Doolin et al., describes a main rotor pitch control rod subassembly for a helicopter main rotor assembly. The Doolin et al. patent does not suggest a self-locking linear adjustment mechanism according to the claimed invention.

U.S. Pat. No. 5,538,245, issued on Jul. 23, 1996 to Donald D. Moore, describes a golf club with an adjustable head. The Moore patent does not suggest a self-locking linear adjustment mechanism according to the claimed invention.

U.S. Pat. No. 5,573,290, issued on Nov. 12, 1996 to Edward J. Smith, describes a retaining device for locking pistons that have retractable sliding arms. The Smith patent does not suggest a self-locking linear adjustment mechanism according to the claimed invention.

U.S. Pat. No. 5,800,108, issued on Sep. 1, 1998 to Eric F. Cabahug, describes an apparatus for rapidly engaging and disengaging threaded coupling members. The Cabahug patent does not suggest a self-locking linear adjustment mechanism according to the claimed invention.

U.S. Pat. No. 5,845,898, issued on Dec. 8, 1998, and European Patent Application Publication No. 838,600 A1, published on Aug. 12, 1998, for Werner Halder et al., describe a self-adjusting ball-lock pin for holding together two objects with aligned holes. The Halder et al. patent and European '600 application do not suggest a self-locking linear adjustment mechanism according to the claimed invention.

U.S. Pat. No. 5,846,042, issued on Dec. 8, 1998 to Peter Iannuzzi, describes a fastener/shaft locking and adjustment apparatus and locking system which precisely positions, positively locks, and avoids slippage of a positive locking nut along an elongated element. The Iannuzzi patent does not suggest a self-locking linear adjustment mechanism according to the claimed invention.

U.S. Pat. No. 6,158,930, issued on Dec. 12, 2000 to Mark A. Etter, describes a positioning system adapted for guiding a cutting tool for a portable machine tool with respect to a workpiece for the purpose of machining the workpiece. The Etter patent does not suggest a self-locking linear adjustment mechanism according to the claimed invention.

U.S. Pat. No. 6,361,260 B1, issued on Mar. 26, 2002 to Wendell E. Schirrmacher, describes a quick action tensioning nut for fastening a wheel to the mounting shaft of a wheel balancing machine. The Schirrmacher patent does not suggest a self-locking linear adjustment mechanism according to the claimed invention.

U.S. Pat. No. 6,367,341 B1, issued on Apr. 9, 2002 to Howard L. Sleeper et al., describes a slidable fixture positioner for positioning an object in a remot location with a high degree of precision. The Sleeper et al. patent does not suggest a self-locking linear adjustment mechanism according to the claimed invention.

U.S. Pat. No. 6,485,214 B2, issued on Nov. 26, 2002 to Albrecht P. Schill, describes a coupling device, in combination with two coupling members, for coaxially coupling the first coupling member to the second coupling member. The Schill patent does not suggest a self-locking linear adjustment mechanism according to the claimed invention.

U.S. Pat. No. 6,511,100 B1, issued on Jan. 28, 2003 to Pascal Le Clinche, describes a ball-bearing coupler. The Le Clinche patent does not suggest a self-locking linear adjustment mechanism according to the claimed invention.

U.S. Pat. No. 6,523,411 B2, issued on Feb. 25, 2003 to Jack Lee, describes a switch device of a socket wrench extension. The Lee patent does not suggest a self-locking linear adjustment mechanism according to the claimed invention.

U.S. Pat. No. 6,540,426 B2, issued on Apr. 1, 2003 to a Richard A. Cloyd et al., describes a passive ball capture joint. The Cloyd et al. patent does not suggest a self-locking linear adjustment mechanism according to the claimed invention.

Germany Patent Application Publication Nos. 3,739,710 C1 and 3,839,663 A1, published on Jan. 26, 1989 and Jun. 15, 1989, respectively, describe a device for connecting two tool parts. The Germany '710 and '663 applications do not suggest a self-locking linear adjustment mechanism according to the claimed invention.

Germany Patent Application Publication Nos. 4,000,424 A1 and 4,000,424 C1, published on Jul. 11, 1991, describe clamping device for a rotating body. The Germany '424 applications do not suggest a self-locking linear adjustment mechanism according to the claimed invention.

Great Britain Patent Application Publication No. 2,279,693 A, published on Jan. 11, 1995, describes a ball locking device. The Great Britain '693 application does not suggest a self-locking linear adjustment mechanism according to the claimed invention.

Germany Patent Application Publication No. 19,701,365 A1, published on Jul. 23, 1998, describes a device for releasably attaching a component to a carrier. The Germany '710 application does not suggest a self-locking linear adjustment mechanism according to the claimed invention.

France Patent Application Publication No. 2,812,923 A1, published on Feb. 15, 2002, describes a device including a rigid rod able to translate and rotate one end of which penetrates a recess of a piston. The France '923 application does not suggest a self-locking linear adjustment mechanism according to the claimed invention.

None of the above inventions and patents, taken either singularly or in combination, is seen to describe the instant invention as claimed. Thus a self-locking linear adjustment mechanism solving the aforementioned problems is desired.

SUMMARY OF THE INVENTION

The present invention is a self-locking linear adjustment mechanism. The self-locking linear adjustment mechanism is an assembly that may be configured in the form of a complete rod assembly or a cartridge assembly. The self-locking linear adjustment mechanism in the form of a cartridge assembly includes a self-locking linear adjustment mechanism including a locking tumbler, an adjustment vernier, two end adapters, two roll pins, two precision balls, two locking skirts, two springs, two locking splines, two index pins, and two guide shafts, wherein the self-locking linear adjustment mechanism has a dual function self-locking feature.

The locking tumbler is a longitudinally extending member that extends for a predetermined distance and has two opposing ends. Each end has a recess defined therein. The locking tumbler includes two opposing pockets that may be spherically configured to enable placement and retention of the two precision balls. The balls are positioned not to be in contact with the two faces the locking splines when the self-locking linear adjustment mechanism is in the locked position. The balls are guided by the minor diameter of the internal spline of the adjustment vernier. The locking tumbler is secured in place axially by the use of two standard roll pins that tangentially engage grooves in the locking tumbler.

The roll pins each extend for a predetermined length and have a predetermined diameter. The roll pins are configured for securing the locking tumbler axially in place by tangentially engaging grooves in the locking tumbler, and corresponding holes in the adjustment vernier.

The adjustment vernier includes a central member with two tubular members extending longitudinally away from the central member in opposing directions. Each tubular member includes proximal and distal ends relative to the central member of the adjustment vernier, as well as a plurality of slits equally spaced about the associated tubular member. The equally spaced slits extend for a predetermined distance from the distal end to the proximal end of the associated tubular member. Each tubular member is also externally threaded in a predetermined manner for a predetermined distance from the distal end to the proximal end of the associated tubular member. Each tubular member has a predetermined inner circumference at the proximal end that is less than a predetermined inner circumference at the distal end of the tubular member.

Each end adapter longitudinally extends for a predetermined distance, and includes an inner end and an outer end. The inner end of the end adapter is configured for engaging the distal end of a corresponding tubular member of the adjustment vernier, and the outer end of the end adapter is configured for engaging another element via threading or the like. Between the inner end and the outer end of each end adapter a passage inhibitor is provided that includes a hole defined therein configured in the form of a 'D' or the like for allowing a correspondingly configured guide shafts to pass therethrough. The inner end of the end adapter is configured with inner threading in accordance with the external threading on the corresponding tubular member of the adjustment vernier.

The locking skirts are configured for fitting around an assembly of locking splines, index pins, and guide shafts. The locking splines, index pins, and guide shafts may be configured as a single combined component, wherein one of each may be used in place of the two sets of the three separate components. The locking skirts extend for a predetermined length and have an inner end and an outer end. The inner end is configured for being placed proximate the central member of the adjustment vernier. The outer end is configured for engaging the distal end ramp of the corresponding tubular member of the adjustment vernier. The locking skirts have a raised spherical shoulder on their outside diameters at the outer ends. The spherical shoulder of the locking skirts engage the conical lead in distal end ramps of tubular members of the adjustment vernier providing a uniform radial pressure to expand the slotted ends of the adjustment vernier when the lock is engaged.

The springs are configured for biasing apart the inner end of a locking skirt and an inner end of a corresponding end adapter. The ends of each spring bear against an internal shoulder on an end adapter on one end, and against an internal shoulder of a locking skirt at the opposing end.

Each locking spline extends for a predetermined length and has an inner end and an outer end. The inner end of each locking spline has a plurality of external splines configured for engaging with the internal splines at the proximal end of the tubular elements of the adjustment vernier. Each index pin extends for a predetermined length and has a predetermined diameter. Each index pin is configured for securing the locking spline and the guide shafts together. The guide shafts have a predetermined length and are cross drilled to receive the index pins that secure the locking splines and the guide shafts together. The locking skirts also serve to capture the index pins in place as they are installed through the locking splines and the guide shafts.

Accordingly, it is a principal aspect of the invention to provide a self-locking linear adjustment mechanism including a locking tumbler, an adjustment vernier, two end adapters, two roll pins, two precision balls, two locking skirts, two springs, two locking splines, two index pins, and two guide shafts, wherein the self-locking linear adjustment mechanism has a dual function self-locking feature.

It is another aspect of the present invention to provide a self-locking linear adjustment mechanism including a locking tumbler which is a longitudinally extending member that extends for a predetermined distance and has two opposing ends, each end having a recess defined therein, two opposing pockets configured to enable placement and retention of two precision balls, the balls being positioned not to be in contact with faces of the locking splines when the self-locking linear adjustment mechanism is in a locked position, and the locking tumbler being secured in place axially by two standard roll pins that tangentially engage grooves in the locking tumbler; an adjustment vernier having a central member with two tubular members extending longitudinally away from the central member in opposing directions, each tubular member including proximal and distal ends relative to the central member of the adjustment vernier, and a plurality of slits equally spaced about an associated tubular member, and each tubular member being externally threaded in a predetermined manner for a predetermined distance from the distal end to the proximal end of an associated tubular member; two end adapters, two roll pins, two precision balls, two locking skirts, two springs, two locking splines, two index pins, and two guide shafts, wherein the self-locking linear adjustment mechanism has a dual function self-locking feature.

It is an aspect of the invention to provide improved elements and arrangements thereof in a self-locking linear adjustment mechanism for the purposes described which is inexpensive, dependable and fully effective in accomplishing its intended purposes.

These and other aspects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a self-locking linear adjustment mechanism. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

Figure 1:
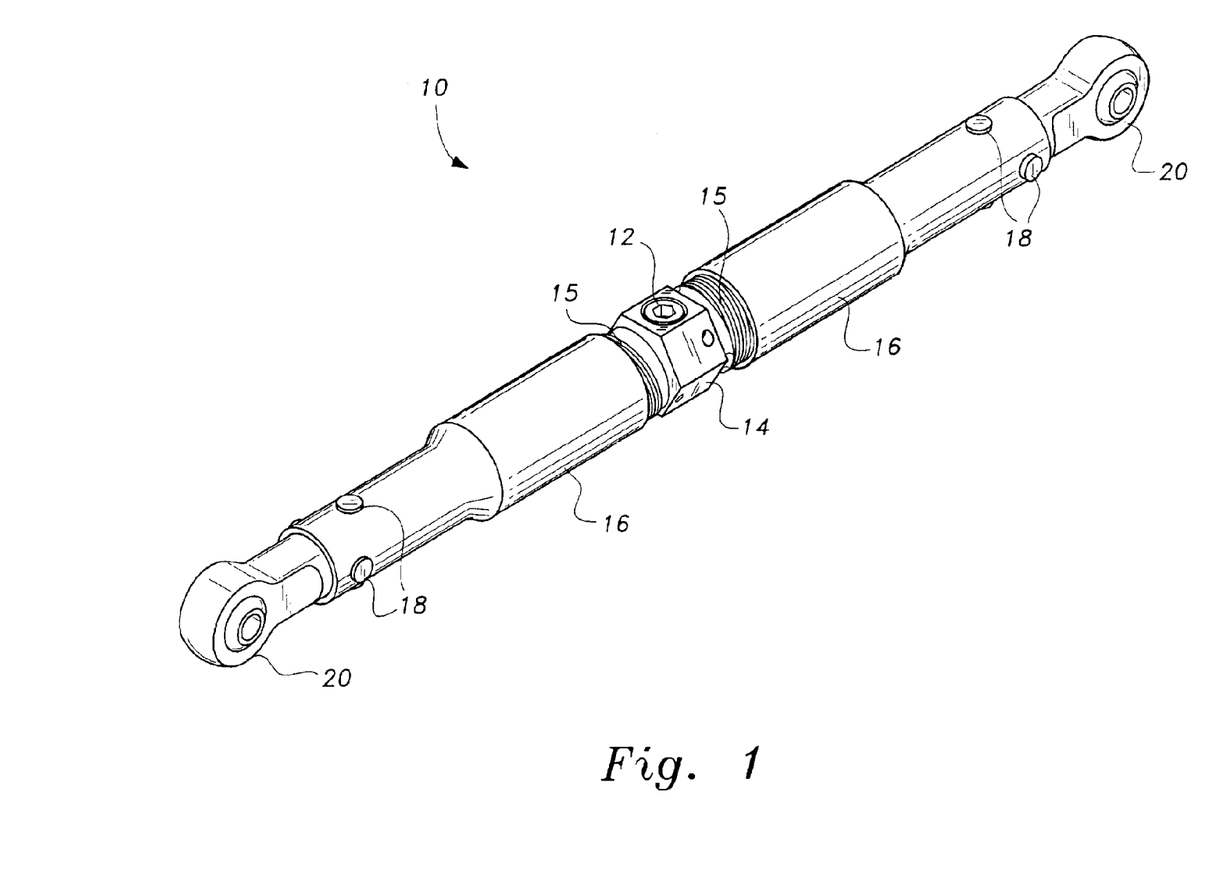
FIG. 1 is a side perspective view of an example of a self-locking linear adjustment mechanism in the form of a complete rod assembly according to the present invention.

Referring to the drawings, FIG. 1 shows an example of a self-locking linear adjustment mechanism according to the present invention in the form of a complete rod assembly 10. The self-locking linear adjustment mechanism in the form of a complete rod assembly 10 enables users to provide a control rod as a single complete assembly. The self-locking linear adjustment mechanism 10 in the form of a complete rod assembly includes a locking tumbler 12, an adjustment vernier 14 with two oppositely extending tubular members 15, and two end adapters 16 appropriately configured for being secured with a connector ending 20 via rivets 18.

FIGS. 2–11 show examples of a more generic self-locking linear adjustment mechanism according to the present invention in the form of a cartridge assembly 100. The self-locking linear adjustment mechanism 100 in the form of a cartridge assembly enables a user to adapt the single part adjustment mechanism 100 to connector endings having particular ending configurations according to the desires of the user. The self-locking linear adjustment mechanism 100 in the form of a cartridge assembly includes a locking tumbler 102, an adjustment vernier 104, two end adapters 106, two roll pins 108, two precision balls 103, two locking skirts 110, two springs 112, two locking splines 114, two index pins 116, and two guide shafts 118.

Figure 2:
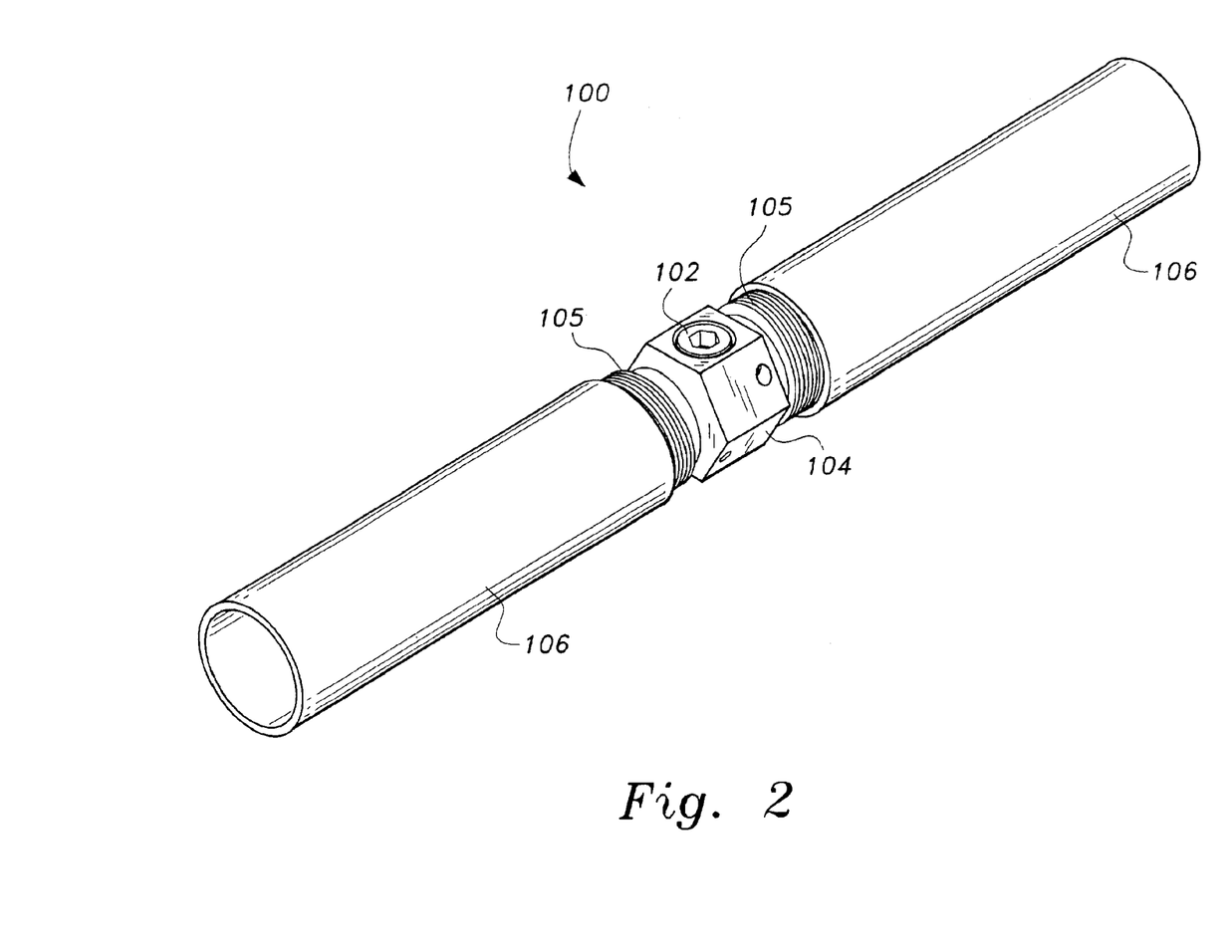
FIG. 2 is a side perspective view of another example of a self-locking linear adjustment mechanism in the form of a cartridge assembly according to the present invention.
Figure 3:
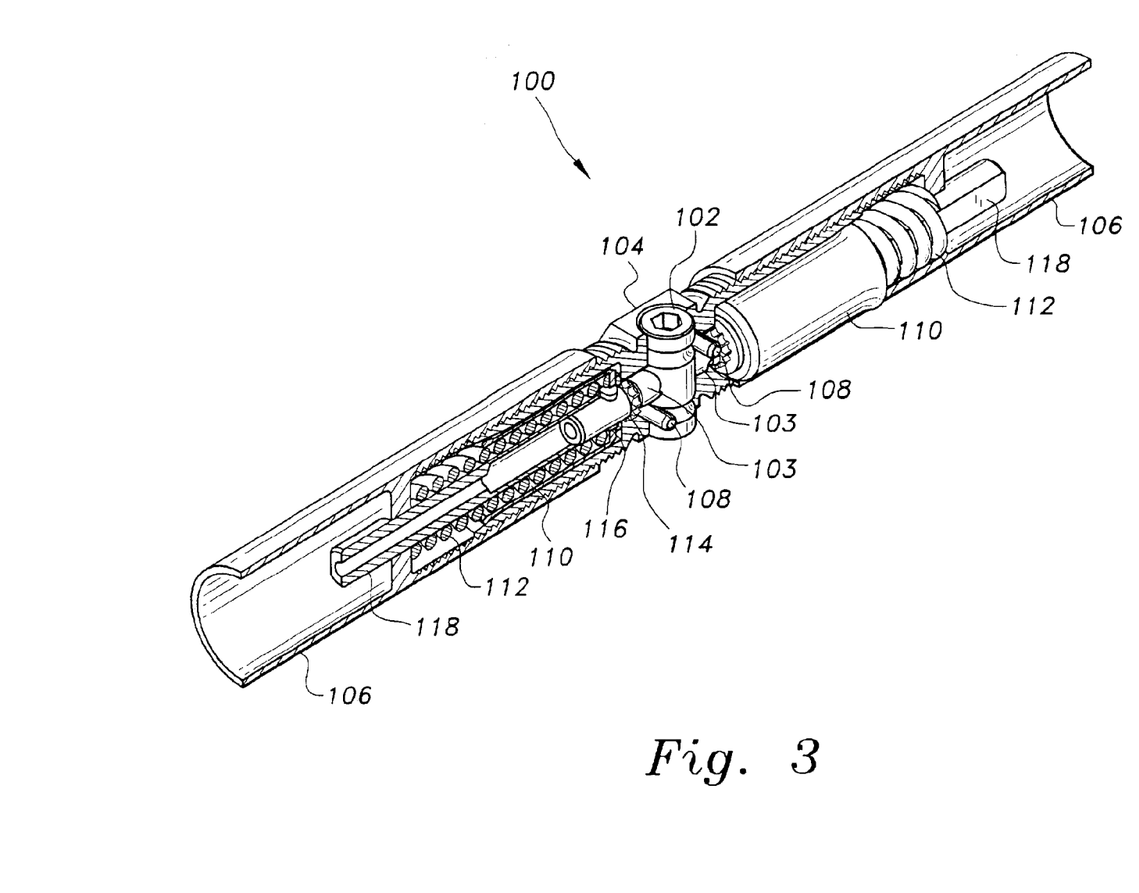
FIG. 3 is a cross-sectional side perspective view of the self-locking linear adjustment mechanism example shown in FIG. 2.
Figure 4:
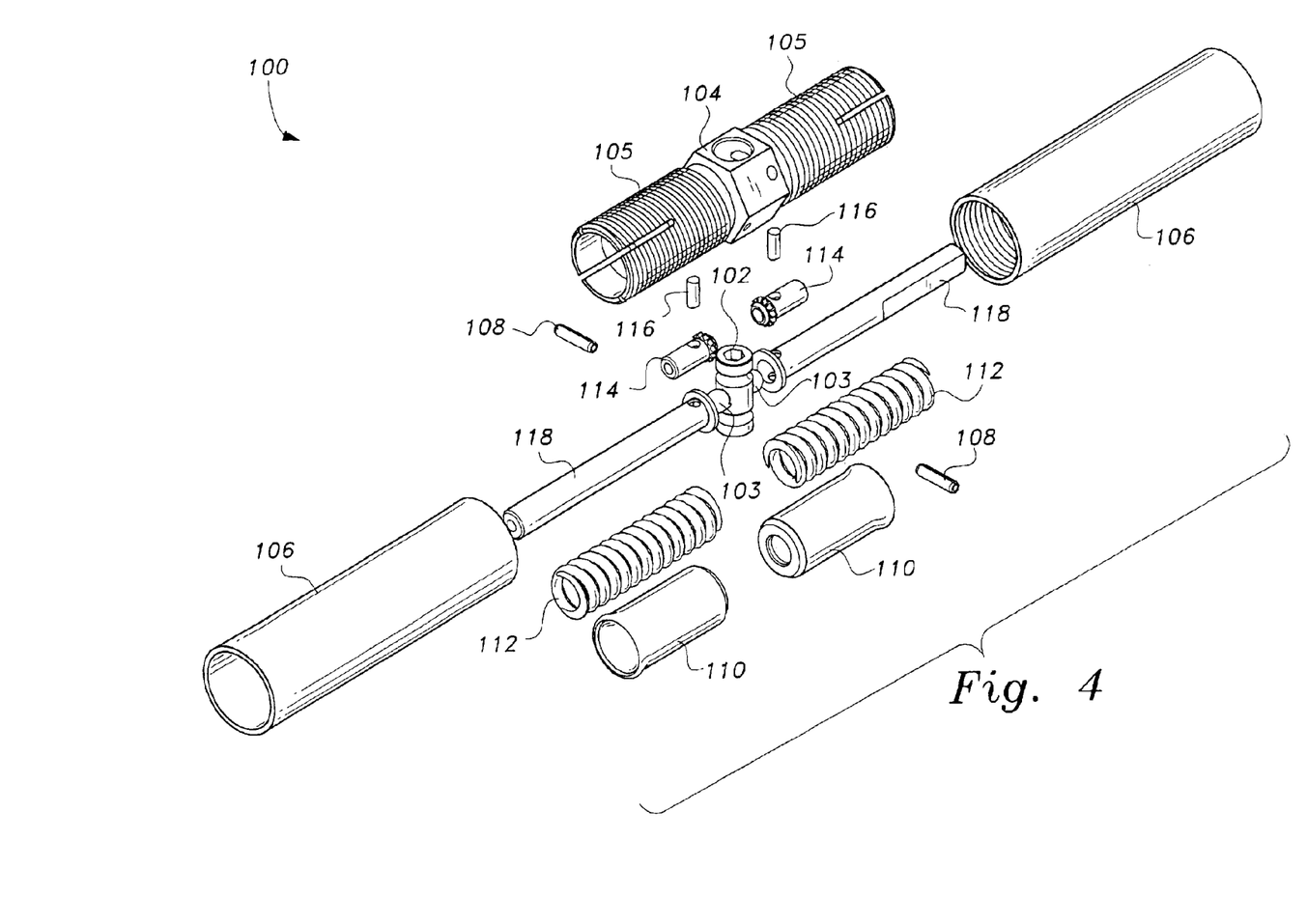
FIG. 4 is an exploded side perspective view of the self-locking linear adjustment mechanism example shown in FIG. 2.
Figure 5:
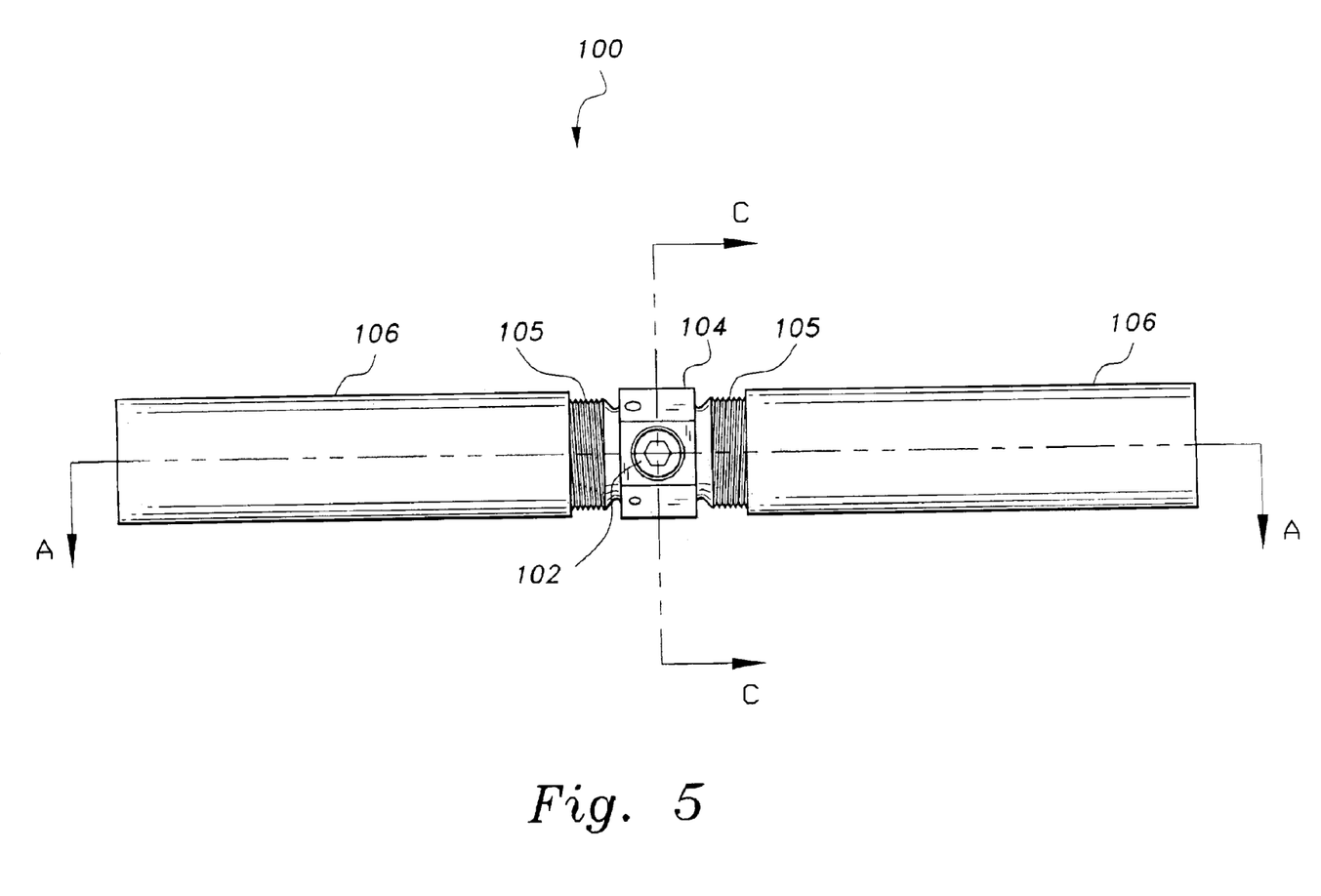
FIG. 5 is a top view of the self-locking linear adjustment mechanism example shown in FIG. 2.
Figure 6:
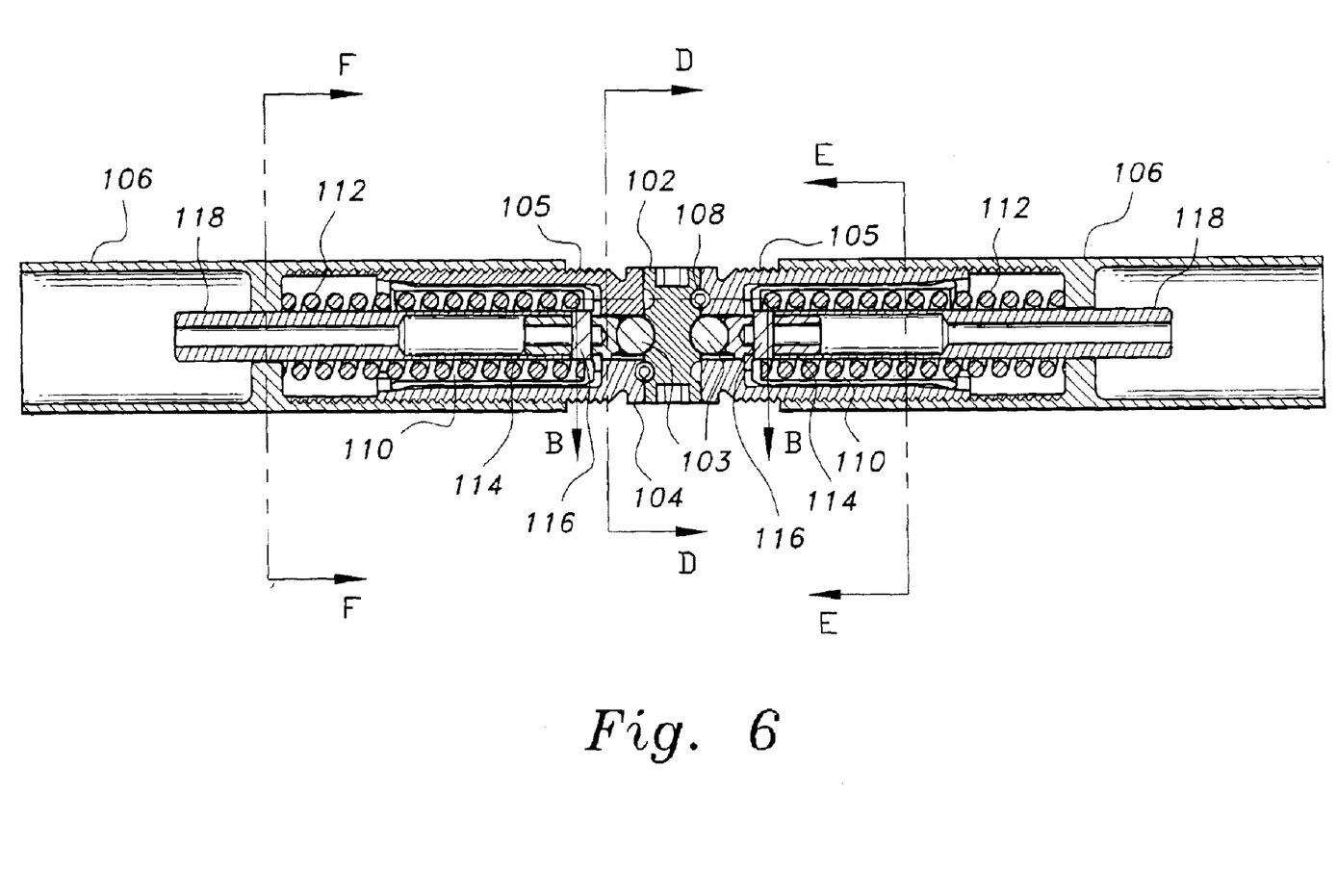
FIG. 6 is a cross-sectional view along line A—A of the self-locking linear adjustment mechanism example shown in FIG. 5.
Figure 7:
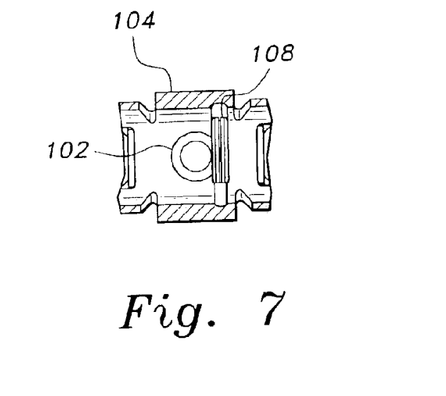
FIG. 7 is a cross-sectional view along line B—B of the self-locking linear adjustment mechanism example shown in FIG. 6.
Figure 8:
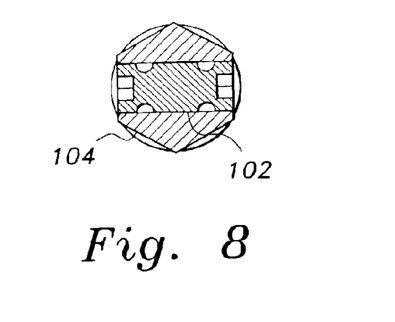
FIG. 8 is a cross-sectional view along line C—C of the self-locking linear adjustment mechanism example shown in FIG. 5.
Figure 9:
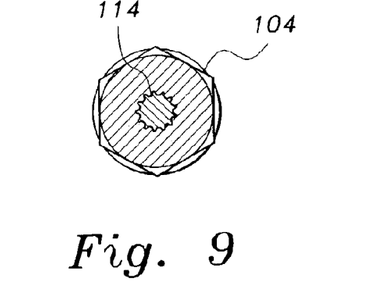
FIG. 9 is a cross-sectional view along line D—D of the self-locking linear adjustment mechanism example shown in FIG. 6.
Figure 10:
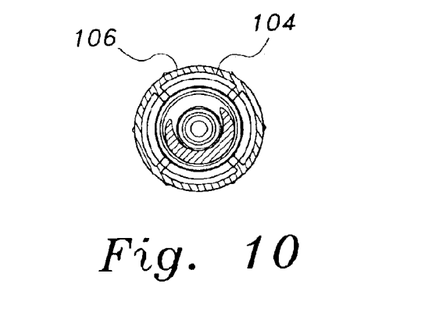
FIG. 10 is a cross-sectional view along line E—E of the self-locking linear adjustment mechanism example shown in FIG. 6.
Figure 11:
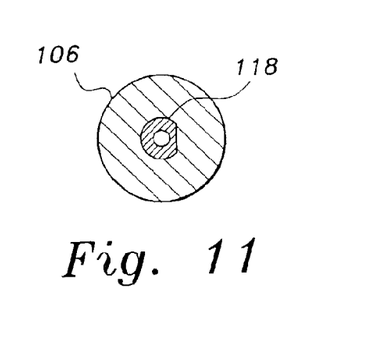
FIG. 11 is a cross-sectional view along line F—F of the self-locking linear adjustment mechanism example shown in FIG. 6.

The locking tumbler 102 is a longitudinally extending member that extends for a predetermined distance and has two opposing ends. Each end has a recess defined therein. Preferably the recess at either end is configured in form of a polygon, such as a hexagon or the like. For example, configuring the polygon of the locking tumbler 102 in the form of a hexagon enables a user to readily actuate the locking tumbler 102 with a corresponding size of Allen wrench. The locking tumbler 102 includes two opposing pockets that may be spherically configured, or the like, to enable placement and retention of two precision balls 103, such as steel balls or the like. The precision balls 103 are positioned not to be in contact with the two faces the locking splines 114 when the self-locking linear adjustment mechanism 100 is in the locked position. The precision balls 103 are guided by the minor diameter of the internal spline of the adjustment vernier 102. The locking tumbler 102 is secured in place axially by the use of two standard roll pins 108 that tangentially engage grooves in the locking tumbler 102.

The roll pins 108 each extend for a predetermined length and have a predetermined diameter. The roll pins 108 are configured for securing the locking tumbler 102 axially in place by tangentially engaging grooves in the locking tumbler 102 and corresponding holes in the adjustment vernier 104.

The adjustment vernier 104 includes a central member with two tubular members 105 extending longitudinally away from the central member in opposing directions. Each tubular member 105 includes proximal and distal ends relative to the central member of the adjustment vernier 104, as well as a plurality of slits equally spaced about the associated tubular member. The equally spaced slits extend for a predetermined distance from the distal end to the proximal end of the associated tubular member 105. Each tubular member 105 is also externally threaded in a predetermined manner for a predetermined distance from the distal end to the proximal end of the associated tubular member 105. Preferably, the tubular members 105 are externally threaded with right hand threads of unequal pitch when a vernier style adjustment is desired, such as a vernier style 14RH/20RH thread pitch ratio to provide a lockable increment of 0.00077 inch and a range of +/−0.100 inch. Alternatively, one tubular member 105 may be configured with a right hand thread and the other tubular member 105 may be configured with a left hand thread of equal pitch when a coarser turnbuckle style adjustment is desired, such as a 20RH/20LH turnbuckle style thread pitch ratio. Each tubular member 105 has a predetermined inner circumference at the proximal end that is less than a predetermined inner circumference at the distal end of the tubular member 105. Preferably, the predetermined inner circumference at the distal end reduces in value quickly as distance passes from the distal end to the proximal end of the tubular member 105, e.g., in the form of a distal end ramp or the like, and then the inner circumference reaches a value that remains generally consistent for the majority of the length of the tubular element 105.

Each end adapter 106 longitudinally extends for a predetermined distance, and includes an inner end and an outer end. The inner end of the end adapter 106 is configured for engaging the distal end of a corresponding tubular member of the adjustment vernier 104, and the outer end of the end adapter 106 is configured for engaging another element via threading or the like. Between the inner end and the outer end of each end adapter 106 a passage inhibitor is provided that includes a hole defined therein configured in the form of a 'D' or the like for allowing a correspondingly configured guide shafts 118 to pass therethrough. The inner end of the end adapter 106 is configured with inner threading in accordance with the external threading on the corresponding tubular member 105 of the adjustment vernier 104. For example, if the external threading on one tubular member 105 of the adjustment vernier 104 were with right hand threads of one pitch, such as 14RH or the like, the internal threading of the corresponding end adapter 106 will be threaded accordingly in a vernier style, e.g., 14RH, in accordance with the desires of the user. Alternatively, if the external threading on one tubular member 105 of the adjustment vernier 104 were with right hand threads of one pitch, such as 20RH or the like, the internal threading of the corresponding end adapter 106 may be threaded accordingly in a turnbuckle style, e.g., 20LH.

The locking skirts 110 are configured for fitting around an assembly of locking splines 114, index pins 116, and guide shafts 118. The locking skirts 110 extend for a predetermined length and have an inner end and an outer end. The inner end is configured for being placed proximate the central member of the adjustment vernier 104. The outer end is configured for engaging the distal end ramp of the corresponding tubular member of the adjustment vernier 104. The locking skirts 110 have a raised spherical shoulder on their outside diameters at the outer ends. The spherical shoulder of the locking skirts 110 engage the conical lead in distal end ramps of the tubular members of the adjustment vernier 104 providing a uniform radial pressure to expand the slotted ends of the adjustment vernier 104 when the lock is engaged.

The springs 112 are configured for biasing apart the inner end of a locking skirt 110 and an inner end of a corresponding end adapter 106. The ends of each spring 112 bear against an internal shoulder on an end adapter 106 on one end and against an internal shoulder of a locking skirt 110 at the opposite end. When in the locked position the springs 112 force the engagement of the internal splines of the adjustment vernier 104 and the external splines of the locking splines 114. The mechanism does not bottom at the spline engagement. The spring load also simultaneously drives the locking skirts 110 into the conical lead in distal end ramps of the tubular members 105 of the adjustment vernier 104. This action expands the slotted ends of the tubular members 105 of the adjustment vernier 104 using this mechanical advantage to force a tight engagement of its external threads with the internal threads of the rod end adapters thereby eliminating all axial free play in both directions that may exist due to manufacturing tolerances within the threaded engagement. This constitutes the dual function locking features of this mechanism, positive rotational locking to secure the adjusted position and positive axial locking for the elimination of axial free play in the locked position.

Each locking spline 114 extends for a predetermined length and has an inner end and an outer end. The inner end of each locking spline 114 has a plurality of external splines configured for engaging with the internal splines at the proximal end of the tubular elements of the adjustment vernier 104. Each index pin 116 extends for a predetermined length and has a predetermined diameter. Each index pin 116 is configured for securing the locking spline 114 and the guide shafts 118 together. The guide shafts 118 have a predetermined length and are cross drilled to receive the index pins 116 that secure the locking splines and the guide shafts 118 together. The locking skirts 110 also serve to capture the index pins 116 in place as they are installed through the locking splines 114 and the guide shafts 118.

The vernier linear adjustment mechanism 10 or 100 enables a user to effect a vernier adjustment with a unique dual function self-locking feature. The vernier linear adjustment mechanism 10 or 100 may be used to adjust the length of linear control rods or any other application that requires precise changes in length between opposing ends with a simple, reliable and easily accessible locking provision. The only tool required for operation is a common Allen wrench to engage or disengage the locking mechanism. This simple locking feature has the advantage that it only requires one hand to operate which makes its use ideal for confined spaces or locations that are awkward to reach with both hands. The vernier linear adjustment mechanism 10 or 100 works equally well regardless of its spatial orientation when installed.

To unlock the self-locking linear adjustment mechanism 100 a user simply rotates the locking tumbler 102, approximately 90 degrees, via one of the Allen wrench pockets. This drives the steel balls 103 outward pushing the locking splines 114, disengaging the mated splined locks, and relieving the radial pressure on the conical lead in distal end ramps of the tubular members 105 of the adjustment vernier 104 in one motion while compressing the two coil springs 112. The adjustment vernier 104 is then free to rotate to achieve the desired length change in the given application. Friction within an unloaded and disengaged mechanism is low enough to allow rotation by finger pressure only. No other wrenches are required. A visual and tactile indication of lock position may be provided by virtue of raised beads at the face of the locking tumbler 102 and the adjacent wrench flat of the adjustment vernier 104 that will align when the lock is engaged.

This mechanism may be scaled up or down in size depending on load carrying requirements and space limitations. An additional feature may be incorporated that would provide a light detent on one of the locking element faces. This would provide a reference 'feel or click' to the user as each index point is reached during adjustment.

It is possible to vary the thread pitch ratio between the two threaded ends of the adjustment vernier and the number of serrations in the locking elements to achieve a varied range of length increments per index point. Locked incremental length adjustments as small as one ten thousandth of an inch are achievable with this mechanism. The range of adjustment provided as described above for vernier style is +/−0.100 inch, and for turnbuckle style is +/−0.800 inch. This range can be modified to fit particular needs of any application.

While the material of elements of the vernier linear adjustment mechanism 10 or 100 may be made of any durable material according to the desires of the user, the material is preferably medium to high strength metal, such as stainless steel or titanium developed by appropriate ageing treatment that is corrosion resistant and has excellent transverse properties, excellent hardness, wear resistance, low coefficient of friction, and is resistant to heat, such as 15-5ph CRES per AMS 5659, 17-7ph CRES per ASTM A 313, Ti3-8-6-4-4 per AMS 4957, and dense chrome plating performed by QQ-C-320B Class 2 Type II.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

I claim:

1. A locking linear adjustment mechanism comprising:

a locking tumbler having an axis and two ends each having a recess defined therein;

an adjustment vernier having a center, an internal spline, and two threaded ends of different pitch, said adjustment vernier being interconnected with the locking tumbler, and being configured to effect a vernier linear adjustment;

two end adapters each having an inner threaded end and an outer end, each inner end being interconnected to the adjustment vernier, and each outer end being configured to be joined to any device requiring linear adjustment;

two roll pins configured to secure the locking tumbler axially in place;

two locking skirts each having an inner end with an internal shoulder and an outer end with a raised spherical shoulder;

two precision balls;

two springs each having two ends, each spring being configured to bias apart the inner end of one of the two locking skirts and the inner end of one of the two end adapters;

two locking splines configured to lock rotation of the adjustment vernier when engaged with the internal spline of the adjustment vernier;

two index pins; and two guide shafts, wherein the locking tumbler is configured to fit between the locking skirts and to rotate about the axis of the locking tumbler, thereby causing the two precision balls to move outward and inward from the center of the adjustment vernier, and the recesses of the tumbler are each configured to enable insertion of an operation tool; the two precision balls are configured to be driven outward and inward by the locking tumbler against a spring force to lift and drop the locking splines in and out of engagement with the internal spline of the adjustment vernier; the two end adapters are configured to fit around the adjustment vernier with the interconnected locking tumbler; each locking skirt is configured to fit around one locking spline, index pin, guide shaft, and spring, with the precision balls positioned on either side of the locking tumbler forming an assembly, and wherein the locking linear adjustment mechanism has a dual function locking feature with the use of a single tool.

2. The locking linear adjustment mechanism according to claim 1, wherein the locking tumbler is a longitudinally extending member that extends for a predetermined distance.

3. The locking linear adjustment mechanism according to claim 2, wherein the locking tumbler further comprises two opposing pockets configured to enable placement and retention of the two precision balls.

4. The locking linear adjustment mechanism according to claim 3, wherein the balls are positioned not to be in contact with faces of the locking splines when the locking linear adjustment mechanism is in a locked position.

5. The locking linear adjustment mechanism according to claim 3, wherein the balls are guided by a diameter of the internal spline of the adjustment vernier.

6. The locking linear adjustment mechanism according to claim 1, wherein the locking tumbler is secured in place axially by two standard roll pins that tangentially engage grooves in the locking tumbler.

7. The locking linear adjustment mechanism according to claim 1, wherein the adjustment vernier includes a central member with two tubular members extending longitudinally away from the central member in opposing directions.

8. The locking linear adjustment mechanism according to claim 7, wherein each tubular member includes proximal and distal ends relative to the central member of the adjustment vernier, and a plurality of slits equally spaced about an associated tubular member.

9. The locking linear adjustment mechanism according to claim 8, wherein each tubular member is externally threaded in a predetermined manner for a predetermined distance from the distal end to the proximal end of an associated tubular member.

10. The locking linear adjustment mechanism according to claim 9, wherein each tubular member has a predetermined inner circumference at the proximal end that is less than a predetermined inner circumference at the distal end of the tubular member.

11. The locking linear adjustment mechanism according to claim 7, wherein each end adapter longitudinally extends for a predetermined distance, has inner and outer ends, the inner end of the end adapter being configured for engaging the distal end of a corresponding tubular member of the adjustment vernier, and the outer end of the end adapter being configured for engaging another element.

12. The locking linear adjustment mechanism according to claim 7, wherein the locking skirts each extend for a predetermined length, the inner end of each locking skirt being configured for being placed proximate the central member of the adjustment vernier, and the outer end of each locking skirt being configured to engage a distal end ramp of the corresponding tubular member of the adjustment vernier.

13. The locking linear adjustment mechanism according to claim 1, wherein the roll pins are configured to secure the locking tumbler axially in place by tangentially engaging grooves in the locking tumbler and corresponding holes in the adjustment vernier.

14. The locking linear adjustment mechanism according to claim 1, wherein between the inner end and the outer end of each end adapter a passage inhibitor is provided that includes a hole defined therein configured for allowing a correspondingly configured guide shafts to pass therethrough.

15. The locking linear adjustment mechanism according to claim 1, wherein when the locking linear adjustment mechanism is in a locked position, the springs force engagement of the internal spline of the adjustment vernier and external splines of the locking splines, a load of the springs simultaneously drives the locking skirts into a conical lead in distal end ramps of the tubular members of the adjustment vernier, thereby expanding slotted ends of the adjustment vernier to force a tight engagement of the external threads of the adjustment vernier with the internal threads of the adapter ends thereby eliminating all axial free play in both directions that may exist due to manufacturing tolerances within the threaded engagement, and when the locking linear adjustment mechanism is in an unlocked position, the precision balls are driven outward pushing the locking splines, disengaging mated splined locks, and relieving radial pressure on lead in distal end ramps of the threaded ends of the adjustment vernier in one motion while compressing the two springs, thereby freeing the adjustment vernier to enable rotation of the adjustment vernier with low friction to achieve a desired length change in a given application.

16. The locking linear adjustment mechanism according to claim 1, wherein each locking spline extends for a predetermined length and has an inner end and an outer end, the inner end of each locking spline having a plurality of external splines configured for engaging with internal splines at proximal ends of the ends of the adjustment vernier.

17. A locking linear adjustment mechanism comprising:

a locking tumbler having an axis and two ends each having a recess defined therein;

an adjustment vernier having a center, an internal spline, and two threaded ends of different pitch, said adjustment vernier being interconnected with the locking tumbler, and being configured to effect a vernier linear adjustment;

two end adapters each having an inner threaded end and an outer end, each inner end being interconnected to the adjustment vernier, and each outer end being configured to be joined to any device requiring linear adjustment;

two roll pins configured to secure the locking tumbler axially in place;

two locking skirts each having an inner end with an internal shoulder and an outer end with a raised spherical shoulder;

two precision balls;

two springs each having two ends, each spring being configured to bias apart the inner end of one of the two locking skirts and the inner end of one of the two end adapters;

two locking splines configured to lock rotation of the adjustment vernier when engaged with the internal spline of the adjustment vernier;

two index pins; and two guide shafts, wherein the locking tumbler is configured to fit between the locking skirts and to rotate about the axis of the locking tumbler, thereby causing the two precision balls to move outward and inward from the center of the adjustment vernier; the ends of the adjustment vernier each include proximal and distal ends relative to a central member of the adjustment vernier, and a plurality of slits equally spaced about the associated end, each end being externally threaded in a predetermined manner for a predetermined distance from the distal end to the proximal end of an associated end; and the recesses of the tumbler are each configured to enable insertion of an operation tool; the two precision balls are configured to be driven outward and inward by the locking tumbler against a spring force to lift and drop the locking splines in and out of engagement with the internal spline of the adjustment vernier; the two end adapters are configured to fit around the adjustment vernier with the interconnected locking tumbler; each locking skirt is configured to fit around one locking spline, index pin, guide shaft, and spring, with the precision balls positioned on either side of the locking tumbler forming an assembly, and wherein the locking linear adjustment mechanism has a dual function locking feature with the use of a single tool.

18. The locking linear adjustment mechanism according to claim 17, wherein when the locking linear adjustment mechanism is in a locked position, the springs force engagement of the internal spline of the adjustment vernier and external splines of the locking splines, a load of the springs simultaneously drives the locking skirts into a conical lead in distal end ramps of the tubular members of the adjustment vernier, thereby expanding slotted ends of the adjustment vernier to force a tight engagement of the external threads of the adjustment vernier with the internal threads of the adapter ends thereby eliminating all axial free play in both directions that may exist due to manufacturing tolerances within the threaded engagement, and when the locking linear adjustment mechanism is in an unlocked position, the precision balls are driven outward pushing the locking splines, disengaging mated splined locks, and relieving radial pressure on lead in distal end ramps of the threaded ends of the adjustment vernier in one motion while compressing the two springs, thereby freeing the adjustment vernier to enable rotation of the adjustment vernier with low friction to achieve a desired length change in a given application.

19. A locking linear adjustment mechanism comprising:
  a locking tumbler having an axis and two ends each having a recess defined therein;
  an adjustment vernier having a center, an internal spline, and two threaded ends of different pitch, said adjustment vernier being interconnected with the locking tumbler, and being configured to effect a vernier linear adjustment;
  two end adapters each having an inner threaded end and an outer end, each inner end being interconnected to the adjustment vernier, and each outer end being configured to be joined to any device requiring linear adjustment;
  two roll pins configured to secure the locking tumbler axially in place;
  two locking skirts each having an inner end with an internal shoulder and an outer end with a raised spherical shoulder;
  two precision balls;
  two springs each having two ends, each spring being configured to bias apart the inner end of one of the two locking skirts and the inner end of one of the two end adapters;
  two locking splines configured to lock rotation of the adjustment vernier when engaged with the internal spline of the adjustment vernier;
  two index pins; and
  two guide shafts,
  wherein the locking tumbler is configured to fit between the locking skirts and to rotate about the axis of the locking tumbler, thereby causing the two precision balls to move outward and inward from the center of the adjustment vernier, and the recesses of the tumbler are each configured to enable insertion of an operation tool; the two precision balls are configured to be driven outward and inward by the locking tumbler against a spring force to lift and drop the locking splines in and out of engagement with the internal spline of the adjustment vernier; the two end adapters are configured to fit around the adjustment vernier with the interconnected locking tumbler; the roll pins are configured to secure the locking tumbler axially in place by tangentially engaging grooves in the locking tumbler and corresponding holes in the adjustment vernier; each locking skirt is configured to fit around one locking spline, index pin, guide shaft, and spring, with the precision balls positioned on either side of the locking tumbler forming an assembly, and wherein the locking linear adjustment mechanism has a dual function locking feature with the use of a single tool.

20. The locking linear adjustment mechanism according to claim 19, wherein when the locking linear adjustment mechanism is in a locked position, the springs force engagement of the internal spline of the adjustment vernier and external splines of the locking splines, a load of the springs simultaneously drives the locking skirts into a conical lead in distal end ramps of the tubular members of the adjustment vernier, thereby expanding slotted ends of the adjustment vernier to force a tight engagement of the external threads of the adjustment vernier with the internal threads of the adapter ends thereby eliminating all axial free play in both directions that may exist due to manufacturing tolerances within the threaded engagement, and when the locking linear adjustment mechanism is in an unlocked position, the precision balls are driven outward pushing the locking splines, disengaging mated splined locks, and relieving radial pressure on lead in distal end ramps of the threaded ends of the adjustment vernier in one motion while compressing the two springs, thereby freeing the adjustment vernier to enable rotation of the adjustment vernier with low friction to achieve a desired length change in a given application.

* * * * *